(12) United States Patent
Robin et al.

(10) Patent No.: US 8,481,894 B2
(45) Date of Patent: Jul. 9, 2013

(54) ELECTRICAL COOKING APPARATUS PROVIDED WITH A REMOVABLE COOKING PLATE

(75) Inventors: Jean-Philippe Robin, Groisy (FR); Christophe Gouthiere, Rumilly (FR)

(73) Assignee: SEB S.A., Ecully (FR)

( * ) Notice: Subject to any disclaimer, the term of this patent is extended or adjusted under 35 U.S.C. 154(b) by 242 days.

(21) Appl. No.: 13/017,358

(22) Filed: Jan. 31, 2011

(65) Prior Publication Data

US 2011/0186562 A1    Aug. 4, 2011

(30) Foreign Application Priority Data

Feb. 1, 2010 (FR) ...................... 10 50693

(51) Int. Cl.
*H05B 3/68* (2006.01)
*A47J 37/07* (2006.01)

(52) U.S. Cl.
USPC .......................... 219/450.1; 99/339

(58) Field of Classification Search
USPC .................... 219/450.1, 451, 452.11, 452.12, 219/458.1, 524, 525; 99/339, 340, 372, 393, 99/402, 422, 427; 292/80–86, 121–129, 96, 292/97
See application file for complete search history.

(56) References Cited

U.S. PATENT DOCUMENTS

| 3,632,982 A | | 1/1972 | Linger |
| 3,822,905 A | * | 7/1974 | Bell ................................ 292/87 |
| 4,920,771 A | * | 5/1990 | Jiang .................................. 70/4 |
| 6,555,795 B2 | | 4/2003 | Glicksman |
| 2002/0153366 A1 | | 10/2002 | Glucksman |
| 2008/0116193 A1 | | 5/2008 | Lam |

\* cited by examiner

*Primary Examiner* — Sang Paik
(74) *Attorney, Agent, or Firm* — Harness, Dickey & Pierce, P.L.C.

(57) ABSTRACT

An electrical cooking apparatus comprises a base, a cooking plate separable from the base, an electrical heating resistance integral with the cooking plate, and electrical connectors borne by the base and adapted to be connected to electrical heating resistance. The base bears an extracting member movable between a rest position and an extraction position, and adapted to cause the disconnection of electrical resistance from connectors and the release of the cooking plate from the base when displaced from the rest position to the extraction position. The cooking plate is movable from a cooking position in which electrical resistance is connected to connectors, and a released position in which electrical resistance is disconnected therefrom, and the extracting member is adapted to move the cooking plate from the cooking position to the released position thereof when moved from its rest position to its extraction position.

14 Claims, 2 Drawing Sheets

ELECTRICAL COOKING APPARATUS PROVIDED WITH A REMOVABLE COOKING PLATE

FIELD

The present invention relates to a cooking plate type electrical cooking apparatus, such as a single plate, electrical barbecue type, or a double plate, waffle iron type, meat grill.

BACKGROUND

An electrical cooking apparatus of the type comprising a base, a cooking plate separable from the base, an electrical heating resistance integral with the cooking plate, and electrical connectors borne by the base and adapted to be connected to the electrical heating resistance is known.

Such an apparatus is described in U.S. Pat. No. 6,555,795, for example. More particularly, this document discloses a waffle iron whose double sided cooking plates (provided with an electrical resistance enclosed between both faces) are separable from a hinge bearing electrical connectors, the separation performed through pulling by a user.

The drawback of this apparatus is that the way the separation of the cooking plate from the base is performed is not very practical. Moreover, this forced displacement becomes more complicated as the cooking plate is more bulky and heavy. It also requires placing gripping areas on the cooking plate so as the user could have a sufficient hold for the extraction. Finally, it is also possible that the various parts for the electrical connection of the cooking plate to the base be deformed should the pulling not be performed along the axis of these elements until complete disconnection of the plate.

SUMMARY

According to the invention, in the cooking apparatus of the aforementioned type, the base comprises an extraction member movable between a rest position and an extraction position, adapted to cause the disconnection of the electrical resistance and the release of the cooking plate from the base when moved from the rest position to the extraction position thereof. The cooking plate is movable from a cooking position in which the electrical resistance is connected to the connectors, to a released position in which the electrical resistance is disconnected therefrom. The extracting member is adapted to move the cooking plate from its cooking position to its released position when it is moved from its rest position to its extraction position.

On one hand, the presence of the extracting member makes it possible, depending on the configuration of this member, to scale down the effort made by the user. On the other hand, it imposes the displacement of the cooking plate which guaranties a movement with no risk of damaging neither the electrical connectors, nor the terminals of the electrical resistance.

DRAWINGS

Other features of the present invention will become more apparent in the embodiment given as way of a non limitative example and illustrated through the accompanying views of the figures wherein.

DETAILED DESCRIPTION

Figure 1:
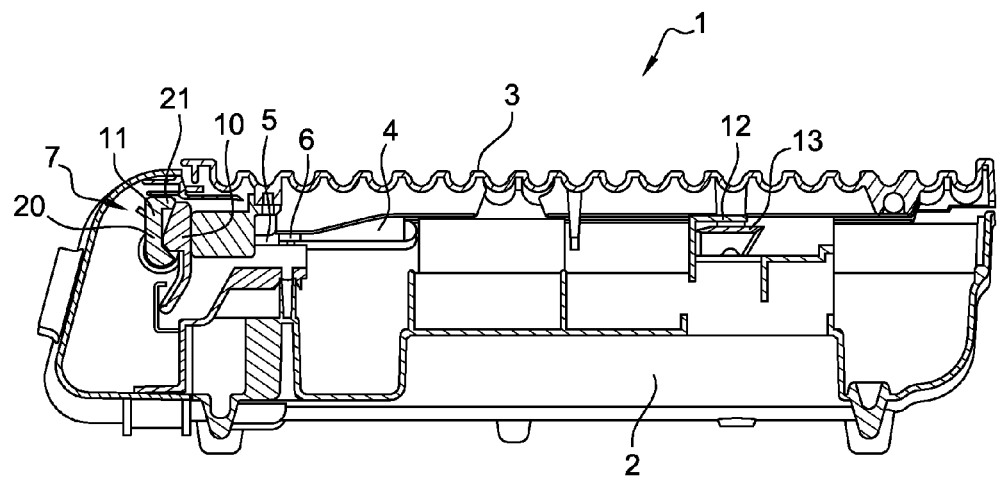
FIG. 1 is a longitudinal cross sectional view of a meat grill whose cooking plate is in the rest position and the extracting member is in the rest position.
Figure 2:
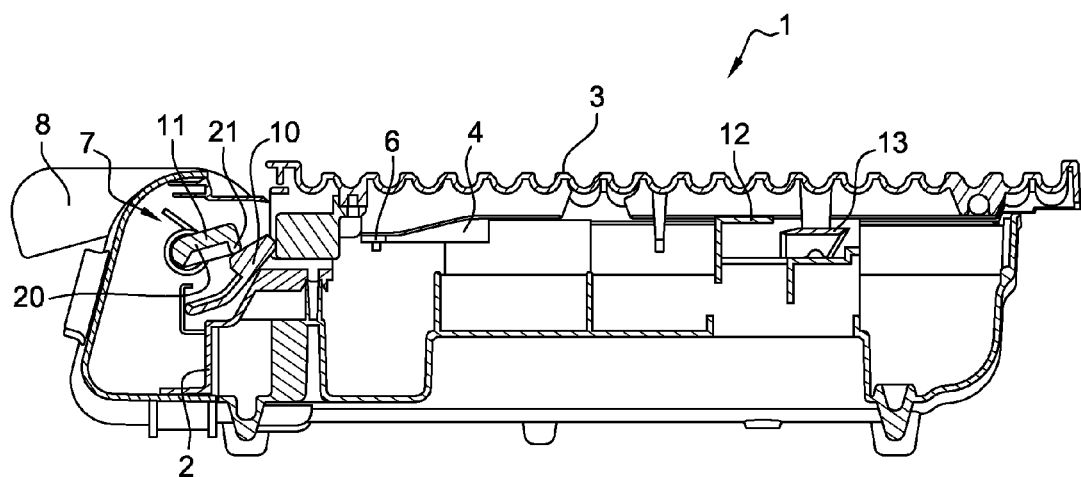
FIG. 2 is a similar view to that of FIG. 1, the cooking plate being in the released position and the extracting member being in the extraction position.
Figure 3:
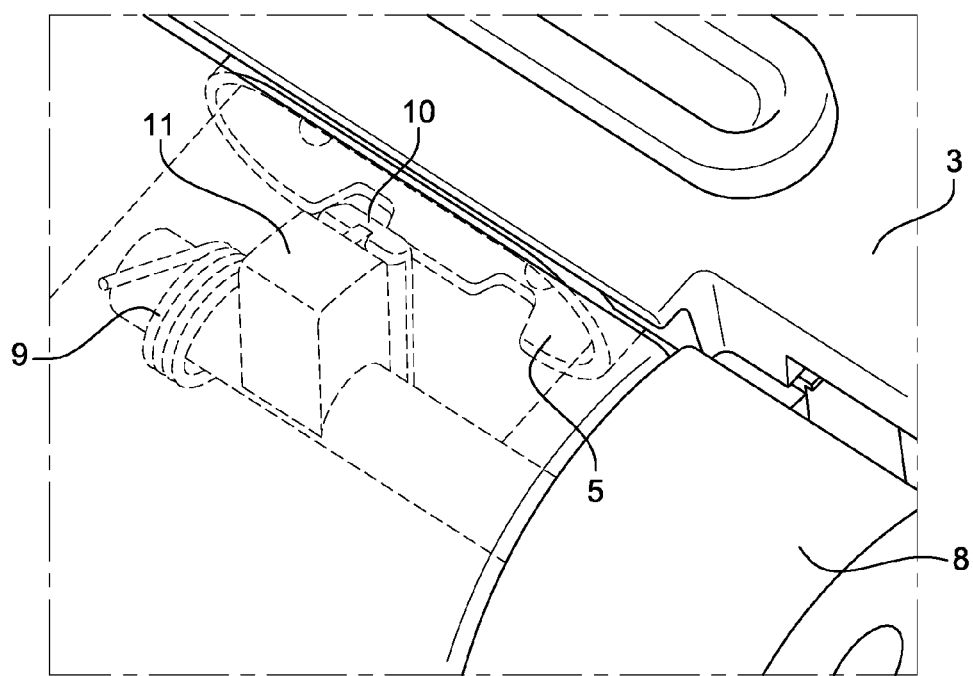
FIG. 3 is a partial top view of the meat grill showing the extracting member in the rest position.
Figure 4:
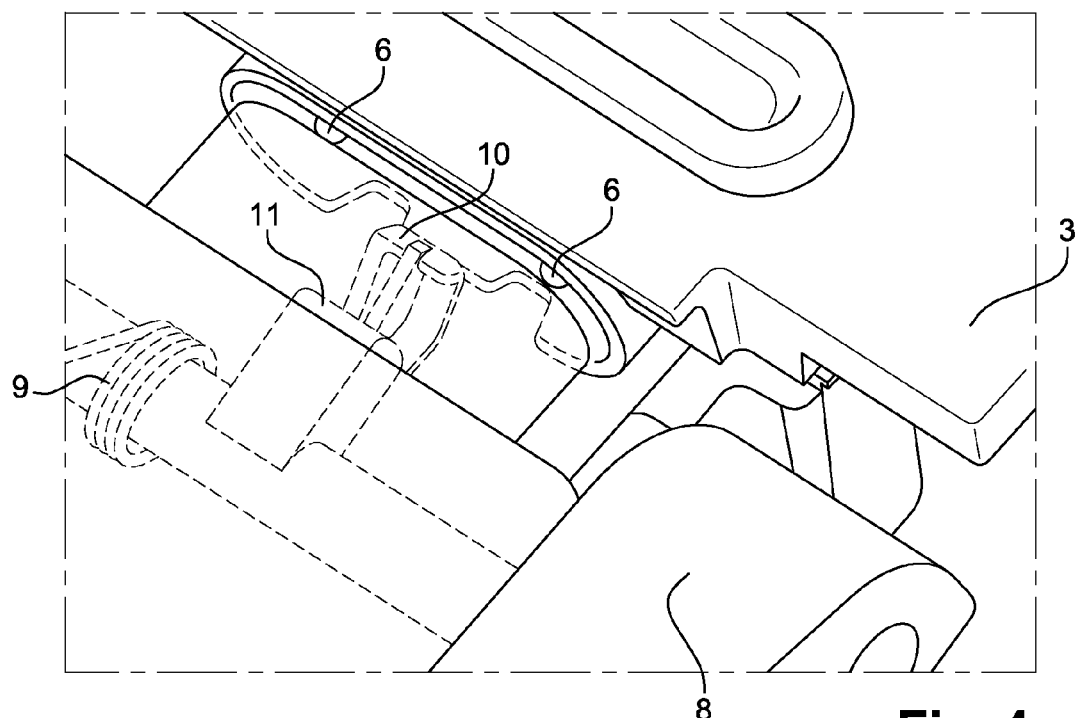
FIG. 4 is a similar view to that of FIG. 3, the extracting member being in the extraction position.

As shown on FIGS. 1 and 2, an electrical cooking apparatus (in this case, a meat grill) comprises a base 2, a cooking plate 3 and an electrical heating resistance 4.

The electrical heating resistance 4 is integral with the cooking plate 3 which is separable from the base 2. Once separated from the base 2, the cooking plate 4 may be easily washed thoroughly. To ensure the electrical connection of resistance 4, base 2 bears electrical connectors 5 that are adapted to be connected to terminals 6 of resistance 4.

To allow a prompt disconnection of electrical resistance 4, base 2 comprises an extracting member 7 which is movably mounted with respect to base 2 between a rest position and an extraction position. This extracting member 7 is adapted to cause disconnection of electrical resistance 4 and release of cooking plate 3 from base 2 when moved from its rest position to its extraction position.

Moreover, in the present embodiment, the cooking plate 3 is movable with respect to base 2 between a cooking position in which the electrical resistance 4 is connected to connectors 5, and a released position in which electrical resistance 4 is disconnected therefrom. The extracting member 7 is also adapted to displace the cooking plate 3 from its cooking position to its released position when displaced from its rest position to its extraction position. The disconnection of electrical resistance 4 takes place simultaneously with the displacement of cooking plate 3, the connectors 5 being fixed with respect to base 2.

More specifically, extracting member 7 comprises a gripping element 8 allowing a user to manipulate extracting member 7. This gripping element 8 is mounted movable between a rest position and an extraction position which respectively correspond to the rest and extraction positions of the extracting member 7. Herein, the gripping element is a lever 8 which is rotationally mounted with respect to base 2.

In the present example, lever 8 is movable over about a quarter turn about a stationary shaft (with respect to base 2) located at its higher end. Lever 8 is substantially vertical (along the front side of apparatus 1) in the rest position, and substantially horizontal (protruding in front of front side) in the extraction position.

Moreover, apparatus 1 comprises a spring 9 biasing gripping element 8 in its rest position.

The extracting member 7 also comprises a driving element 10 which is adapted to be brought in contact against cooking plate 3 so as to displace it. This driving element 10 is mounted movable with respect to base 2 between a rest position and an extraction position which respectively correspond to the rest and extraction positions of extracting member 7. Herein, the driving element 10 is a leg 10 which is rotationally mounted with respect to base 2. When moving from its rest position to its extraction position, the driving element 10 acts as a cam on cooking plate 3 so as to bring it to translate from its cooking position towards its released position.

Moreover, in the present example, considering the size of electrical connectors 5 and terminals 6, their reciprocal disconnection requires a large displacement. However, in order to limit the encumbrance generated by the displacement of gripping element 8 and driving element 10, these elements are movable with respect to each other. Driving element 10 is driven from its rest position to its extraction position by the displacement of gripping element 8 from its rest position to its extraction position. This configuration makes it possible to scale down the displacement of cooking plate 3.

Extracting member 7 further comprises a transmission element 11 which is adapted to be brought in contact against driving element 10 so as to move it when gripping element 8 is displaced. This transmission element 11 is movably mounted with respect to base 2 between a rest position and an extraction position which respectively correspond to the rest and extraction positions of extracting member 7. Herein, transmission element 11 is a finger 11 which is integral with gripping element 8 (thus, rotationally mounted with respect to base 2) and which is adapted to be brought in contact against driving element 10. Transmission element 11 acts as a cam on driving element 10 so as to bring about its rotation from the cooking position to the released position thereof, when transmission element 11 (thus, gripping element 8) moves from its rest position to its extraction position.

In the present example, transmission element 11 is movable over about a quarter of a turn of the same rotation shaft than that of gripping element 8. Finger 11 is substantially vertical in the rest position (the shaft being at its lower end), and substantially horizontal in its extraction position. Driving element 10 is in turn movable over about an eighth of a turn about another rotation shaft (stationary with respect to base 2). Leg 10 is substantially vertical in the rest position (the shaft being at its lower end), and slanted towards cooking plate 3 in the extraction position.

The interface between finger 11 and leg 10 also makes it possible to enhance the displacement amplitude given to cooking plate and limit the required effort to allow the displacement thereof. In fact, finger 11 exhibits a main branch 20 whose orientation defines that of finger 11, and at the free end of this main branch 20, a snug 21 substantially perpendicular thereto. Complementarily, leg 10 has, at its face located at finger 11 side, a plane 22 slightly slanted (at about 20°) with respect to the face located on the side of cooking plate 11 (when leg 20 is vertical in the rest position, plane 22 is slanted by 20° with respect to the vertical).

Furthermore, in order to prevent any displacement of cooking plate 3 which may cause it to separate from base 2 as long as the electrical disconnection of the electrical resistance is not completely made, apparatus 1 comprises a safety system making it possible to separate cooking plate 3 and base 2 solely when plate 3 is in its released position. This safety system makes it possible to avoid any damage of terminals 6 of electrical resistance 4 and connectors 5 of base 2.

More specifically, as shown in FIGS. 1 and 2, the safety system comprises locking members 12 borne by base 2 and complementary locking members 13 borne by cooking plate 3. Locking members 12 and complementary locking members 13 (disposed at a lower level than locking members 12) overlap with each other when cooking plate 3 is in its cooking position and as long as it has not reached its released position. When cooking plate 3 is in the released position, locking members 12 and complementary locking members 13 are completely disconnected from each other, making it possible to separate plate 3.

In use, when a user moves gripping element 8 from its rest position to its extraction position, he/she brings about the corresponding displacement of transmission element 11. The latter, abutting against driving element 10, generates the displacement of driving element 10 from its rest position to its extraction position. The displacement of driving element 10, abutting against cooking plate 3, brings about the displacement of the latter from its cooking position to its released position in which the relative position of locking members 12 and complementary locking members 13 makes its separation from base 2 possible. Thus, during rotation of gripping element 8 by a quarter of a turn, finger 11 also makes a quarter turn and the free end thereof moves horizontally over 15 mm. the scaling down made possible thanks to the presence of leg 10 (which is here of 38 mm in length and whose rotation axis is offset from that of finger 11) makes it possible to move cooking plate over 23.5 mm (and thus, to disconnect it from connectors having a length of 23.5 mm).

The invention claimed is:

1. An electrical cooking apparatus comprising a base, a cooking plate separable from the base, an electrical heating resistance integral with a cooking plate, and electrical connectors borne by the base and adapted to be connected to the electrical heating resistance, the base bearing an extracting member movable between a position and an extraction position, and adapted, when displaced from the rest position to the extraction position, to disconnect the electrical heating resistance from the connectors and to cause a release of the cooking plate from the base, wherein said cooking plate being movable from a cooking position in which the electrical resistance is connected to the connectors, to a released position in which the electrical heating resistance is disconnected therefrom, the extracting member being adapted to displace the cooking plate from the cooking position to the released position when it is displaced from the rest position to the extraction position, wherein the disconnection of said electrical heating resistance takes place simultaneously with the displacement of the cooking plate.

2. The apparatus according to claim 1, wherein the extracting member comprises a gripping element adapted to allow a user to manipulate the extracting member, and mounted movably between a rest position and an extraction position respectively corresponding to the rest and extraction positions of the extracting member.

3. The apparatus according to claim 2, wherein the gripping element is a lever rotationally mounted with respect to the base.

4. The apparatus according to claim 3, wherein the extracting member comprises a driving element movably mounted with respect to the base between a rest position and an extraction position respectively corresponding to the rest and extraction positions of the extracting member, and adapted, when moving from the rest position to the extraction position thereof, be brought in contact against the cooking plate so as to cause it to translate from the cooking position to the released position.

5. The apparatus according to claim 1, wherein the extracting member comprises a driving element movably mounted with respect to the base between a rest position and an extraction position respectively corresponding to the rest and extraction positions of the extracting member, and adapted, when moving from the rest position to the extraction position, to be brought in contact against the cooking plate so as to cause it to translate from the cooking position to the released position.

6. The apparatus according to claim 5, wherein the driving element is a leg rotationally mounted with respect to the base.

7. The apparatus according to claim 6, wherein the driving element is movable with respect to the gripping element, and is driven from the rest position to the extraction position by the displacement of the gripping element from the rest position to the extraction position thereof.

8. The apparatus according to claim 5, wherein the driving element is movable with respect to the gripping element, and is driven from the rest position to the extraction position by the displacement of the gripping element from the rest position to the extraction position.

9. The apparatus according to claim 8, wherein the extracting member comprises a transmission element movably mounted with respect to the base and adapted to be brought in contact against the driving element so as to cause the displacement thereof from the rest position to the extraction position when the gripping element moves from the rest position to the extraction position.

10. The apparatus according to claim 9, wherein the transmission element is a finger integral with the gripping element and adapted to be brought in contact against the driving element so as to cause a rotation thereof.

11. The apparatus according to claim 10, wherein the apparatus comprises a safety system enabling the separation of the cooking plate from the base only when the plate is in the released position.

12. The apparatus according to claim 1, wherein the apparatus comprises a safety system enabling the separation of the cooking plate from the base only when the cooking plate is in the released position.

13. The apparatus according to claim 12, wherein the safety system comprises locking members borne by the base and complementary locking members borne by the cooking plate, said locking members and said complementary locking members overlap with each other as long as the cooking plate is not in the released position.

14. An electrical cooking apparatus comprising a base, a cooking plate separable from the base, an electrical heating resistance integral with the cooking plate, and electrical connectors borne by the base and adapted to be connected to the electrical heating resistance, the base bearing an extracting member movable between a rest position and an extraction position, and adapted, when displaced from the rest position to the extraction position, to disconnect the electrical heating resistance from the connectors and to cause the release of the cooking plate from the base, said cooking plate being movable from a cooking position in which the electrical heating resistance is connected to the connectors, to a released position in which the electrical heating resistance is disconnected therefrom, the extracting member being adapted to displace the cooking plate from the cooking position to the released position when it is displaced from the rest position to the extraction position, wherein the displacement of the cooking plate for disconnecting said electrical resistance is a translatory movement.

* * * * *